(12) United States Patent
Yotz et al.

(10) Patent No.: US 8,605,269 B2
(45) Date of Patent: Dec. 10, 2013

(54) METHOD AND APPARATUS FOR AIMING HEADLIGHTS

(75) Inventors: Gregory A. Yotz, Gridley, KS (US); John Jay Humbard, Pittsburg, KS (US)

(73) Assignee: American Aimers, Inc., Emporia, KS (US)

( * ) Notice: Subject to any disclaimer, the term of this patent is extended or adjusted under 35 U.S.C. 154(b) by 306 days.

(21) Appl. No.: 13/039,159

(22) Filed: Mar. 2, 2011

(65) Prior Publication Data

US 2012/0224171 A1 Sep. 6, 2012

(51) Int. Cl.
*G01J 1/00* (2006.01)

(52) U.S. Cl.
USPC .................. 356/121; 356/139.09; 382/104

(58) Field of Classification Search
USPC .............................. 356/121, 139.09; 382/104
See application file for complete search history.

(56) References Cited

U.S. PATENT DOCUMENTS

| | | | |
|---|---|---|---|
| 2,854,884 A * | 10/1958 | Deming | 356/121 |
| 3,515,483 A * | 6/1970 | Irwin | 356/121 |
| 3,841,759 A | 10/1974 | Turner | |
| 4,948,249 A | 8/1990 | Hopkins et al. | |
| 5,164,785 A | 11/1992 | Hopkins et al. | |
| 5,331,393 A | 7/1994 | Hopkins et al. | |
| 5,373,357 A | 12/1994 | Hopkins et al. | |
| 5,485,265 A | 1/1996 | Hopkins | |
| 5,751,832 A | 5/1998 | Panter et al. | |

FOREIGN PATENT DOCUMENTS

| | | |
|---|---|---|
| CA | 1299858 | 5/1992 |
| CA | 2060271 | 8/1992 |
| EP | 2076096 A1 | 7/2009 |

OTHER PUBLICATIONS

Symetech Corporation BCA 4 Headlamp Alignment Product Information, www.symtechcorp.net/productView/asp?prodID=04010000, copyright 2008, 1 page.
Symtech Corporation BCA 4 Visual Headlamp Alignment System User Manual, www.symtechcorp.net, 10 pages, printed from internet Dec. 1, 2010.
Symtech Corporation SCA 1 Headlamp Product Information, http://www.symtechcorp.net/productView.asp?prodID=01010000, copyright 2008 Symtech Corporation.
Symtech Corporation SCA 1 Visual Headlamp Alignment System User Manual, www.symtechcorp.net, 10 pages, printed from Internet Dec. 1, 2010.

(Continued)

*Primary Examiner* — Tarifur Chowdhury
*Assistant Examiner* — Isiaka Akanbi
(74) *Attorney, Agent, or Firm* — Hovey Williams LLP

(57) ABSTRACT

A vehicle headlight aiming apparatus and method is provided which includes a housing that is vertically and horizontally adjustable along vertical and horizontal tracks. The housing includes a lens for receiving and focusing a headlight beam of a vehicle and forming an image on an internal screen, and a control unit mounted on the housing that is vertically and horizontally pivotable relative to the housing. The housing and the control unit each emit laser beams to configure and measure an alignment of the apparatus to the vehicle. The control unit compensates for an unlevel supporting surface of the apparatus and/or the vehicle and indicates whether the headlight is properly aimed according to a selected aiming standard based on the image, the configuration of the vehicle and the apparatus, and any compensation of any unlevel supporting surface(s) of the apparatus and/or the vehicle.

3 Claims, 10 Drawing Sheets

(56) References Cited

OTHER PUBLICATIONS

Symtech Corporation LCA2 EZ Headlamp Alignment Product Information, www.symtechcorp.net/ productView.asp? prodID=02010045, copyright 2008, 1 page.

Symtech Corporation LC 2 EZ Visual Headlamp Alignment System User Manuel, www.symtechcorp.net, 10 pages, printed from internet Dec. 1, 2010.

Symtech Corporation CVA 3 EZ Headlamp Alignment Product Information, www.symtechcorp.net/ productView.asp? prodID=03010000, copyright 2008, 1 page.

Symtech Corporation CVA 3 Visual Headlamp Alignment System User Manual, www.symtechcorp.net, 11 pages, printed from internet Dec. 1, 2010.

Symtech Corporation HBA 5 Headlamp Alignment Product Information, www.symtechcorp.net/productView.asp?prodID=05010000, copyright 2008, 1 page.

Symtech Corporation HBA 5 Electronic Headlamp Alignment System User Manual, www.symtechcorp.net, 11 pages, printed from internet Dec. 1, 2010.

Symtech Corporation HBA 5 P Headlamp Alignment Product Information, www.symtechcorp.net/productView.asp?prodID=05010010, copyright 2008, 1 page.

Lujan USA, Inc. Sniper Professional Model Optical Headlight Aimers product information, www.lujanusa.com.sniper/sniper.htm, copyright2006, 2 pages.

Lujan USA, Inc. Sniper Professional Model Optical Headlight Aimers product details, www.lujanusa.com.sniper/sniper_detail.htm, copyright2006, 6 pages.

Lujan USA, Inc. Sniper Professional Model Optical Headlight Aimers Specification, www.lujanusa.com.sniper/specs.htm, copyright2006, 3 pages.

Lujan USA, Inc. Sniper Model 5405 Professional Optical Headlight Aiming System flier, printed from Internet Dec. 2, 2010, 1 page.

Lujan USA, Inc. Sniper Model 5405 Professional Optical Headlight Aiming System flier, printed from Internet Dec. 2, 2010, 4 page.

Lujan USA, Inc. Sniper Model 5412 Professional Optical Headlight Aimer flier, printed from Internet Dec. 2, 2010, 1 page.

Lujan USA, Inc. Sniper Model 5405 Quick Reference Guide Aiming Low Beam Headlights, printed from Internet Dec. 2, 2010, 3 pages.

Lujan USA, Inc. Sniper Model 5412 Quick Reference Guide, printed from Internet Dec. 2, 2010, 2 pages.

Lujan USA, Inc. Sniper Model 5412a Quick Reference Guide Aiming Low Beam Headlights, printed from Internet Dec. 2, 2010, 3 pages.

Lujan USA, Inc. Sniper Optical Headlight Aimers Power Point Presentation, printed from Internet Dec. 2, 2010, 35 pages.

Dajac Incorporated Osprey XT Headlamp Alignment System brochure, copyright 2006-2010, 2 pages.

Dajac Incorporated Osprey XT User's Manual Revision 7, copyright 2006-2009, 36 pages.

Dajac Inc. Osprey XT Advanced Industrial Vehicle Headlamp Aiming and Testing System, www.dajac.com/osprey_xt.html, copyright 2001-2010, 2 pages.

Dajac Inc. IntelliAim Quick Start Guide Rev. B, printed from www.dajac.com on Dec. 2, 2010, 4 pages.

Tecnolux & Tecnoil Tecno Fanatic Catalogue, 2007 Edition, relevant pages, 18 pages.

Canbuilt Mfg. Model OPT-5405 Professional Headlight Aiming System User's Manual, printed from www.canbuilt.com on Dec. 2, 2010, 32 pages.

Canbuilt Mfg. Model OPT-5405 Catalog Page, printed from www.canbuilt.com on Dec. 2, 2010, 3 pages.

Canbuilt Mfg. Model OPT-5405 Headlight Aimer-Optical product information, www.canbuilt.com/products.asp?cat=7&subcat=64, copyright 2006 Sayco Distributors Ltd., 3 pages.

* cited by examiner

METHOD AND APPARATUS FOR AIMING HEADLIGHTS

BACKGROUND OF THE INVENTION

1. Field of the Invention

The present general inventive concept relates generally to equipment to aim radiant energy projected from a source to render objects visible, and more particularly, to a method and apparatus for aiming headlights of a vehicle.

2. Description of the Related Art

Properly aimed vehicle headlights provide visibility for a driver of a vehicle during times of limited visibility (e.g., at nighttime or in fog), and alert oncoming drivers to the presence of the vehicle. Improperly aimed headlights could unsatisfactorily render objects visible for the driver and blind or otherwise impair the sight of the oncoming drivers.

Headlights are adjustable in both vertical and horizontal directions by, for example, manipulating headlight aiming screws or other vehicle-mounted adjustable members. Adjustment of the headlight causes light projected from the headlights to be aimed according to aiming standards that may vary from country to country. For instance, in the United States, headlights of vehicles are aligned in compliance with aiming standards set forth by the Society of Automotive Engineers (SAE). The SAE standards differ from the aiming standards set forth in Japan and Europe, which also differ from each other.

A vehicle's headlights are required to be aimed in a number of instances. Upon manufacture of the vehicle, it is necessary to aim the headlights. Often, the headlights are aimed according to the standards of the country in which the vehicle is manufactured. Thus, if the vehicle is manufactured in one country and then exported to another country with different aiming standards than the country of manufacture, it may be necessary to reconfigure the aim of the headlights so that they comply with the aiming standards of the import country. Additionally, during the life of the vehicle, one or both headlights may require replacement or become misaligned (e.g., as a result of a collision or wear and tear of the headlight aiming screws). In these situations, it is necessary to reconfigure the aim of the headlights to comply with the applicable aiming standards.

Conventional headlight aimers are subject to a number of limitations. Generally, conventional aimers do not offer a variety of aiming standards and are instead set to a single standard based on the country of expected distribution and use of the device. Further, conventional aimers are typically unable to adapt to use with different types of headlights that may have different shapes and/or sizes (e.g., standard, auxiliary, fog, rectangular, round, and aerodynamic VOL and VOR headlamps). Instead, conventional aimers are commonly set to a single, common headlight type or normalized. Because various headlight types project light differently because replacement headlights may project their beams differently than original equipment supplied with the vehicle or for other reasons, normalization of headlight types may result in an undesired discrepancy from the applicable aiming standard with some headlight types and cause these headlights to perform poorly.

To aim a headlight, it is generally desirable to identify a reference point on the vehicle to ensure the aiming device is aligned with the vehicle. Conventional devices are commonly aligned visually with the vehicle using an operator's best guess with any small variance dismissed by the operator. Such manual alignment typically results in at least a minor undesired discrepancy from the applicable aiming standard, which causes headlights to perform poorly. Additionally, it is difficult to reproduce aiming tests using conventional aiming devices. In testing aim of the vehicle's headlights, if the conventional device is not properly aligned with the vehicle, the test may indicate that the vehicle's headlights are improperly aimed when in fact they are properly aimed in view of the relevant aiming standard. Furthermore, conventional headlight aiming devices may be heavy or difficult to maneuver in a service bay, or may inadequately compensate for inclinations, decries, or defects in the supporting surface.

SUMMARY OF THE INVENTION

A principal object of the present general inventive concept is to provide a headlight aimer apparatus and method that remedies the aforementioned deficiencies of conventional headlight aimers.

Another object of the general inventive concept is to provide a headlight aimer apparatus and method that is adaptable to various headlight standards, adaptable to various headlight types, and produces test results that are easily reproduced.

Another object of the general inventive concept is to provide a headlight aimer apparatus and method that is easy to use, comparatively simple to manufacture, and especially well adapted for the intended usage thereof.

The aforementioned objects and advantages of the present general inventive concept may be achieved by providing a headlight aiming assembly including a stand which may be mounted on a horizontal track that may be operable to permit travel of the stand therealong or alternatively along a supporting surface such a horizontal track, and a guide bracket mounted on a vertical track of the stand that may be operable to permit travel of the guide bracket therealong. A housing secured to the guide bracket and a control unit secured to the housing having an orientation that is adjustable relative to the housing may also be provided.

The assembly may also include a plurality of grooved rollers connecting the guide bracket to the vertical track, and a brake on the guide bracket to selectively permit and prevent movement of the guide bracket relative to the vertical track. The brake may be operable to increase friction between at least one of the plurality of grooved rollers on the guide bracket and the vertical track.

The assembly may also include a counterweight in the stand that is operable to counter a weight of the housing and a level on the housing that may be operable to measure and display a horizontal level status of the housing. A first laser housed in the housing that may be operable to emit a first laser beam therefrom to enable alignment of the housing with a headlight, and a second laser on the control unit that may be operable to emit a second laser beam therefrom to enable alignment of the control unit with a vehicle may also be provided. The control unit may be operable to measure the orientation of the control unit relative to the housing and yield orientation data.

The assembly may also include an external apparatus that may be operable to measure vehicle level data relative to a horizontal level of the vehicle and an input on the control unit that may be operable to receive the vehicle level data. A lens on the housing that may be operable to convert a beam incident on the lens and transmit the beam to an interior surface of the housing to form an image thereon, and a camera in the housing that may be operable to capture image data based on the image and transmit the image data may also be provided. The lens may be a Fresnel lens operable to convert the beam so that the image appears on the interior surface with simulated characteristics indicating that the beam originated from a distance greater than an actual distance. A processor operable to receive the orientation data, the vehicle level data, and the image data, and to determine a status of a headlight based on the orientation data, the vehicle level data, and the image data may also be provided.

The aforementioned objects and advantages of the present general inventive concept may further be achieved by providing method of aiming a headlight including the steps of identifying a centerline of a vehicle having a headlight, aligning a laser beam with the centerline of the vehicle, the laser beam projected from a controller mounted on a housing, the controller having an orientation that is adjustable relative to the housing, yielding orientation data based on the orientation of the controller relative to the housing via a processor in the controller, receiving a headlight beam from the headlight through a lens on the housing, projecting the headlight beam on an interior surface of the housing via the lens to form an image thereon, capturing and storing digital image data based on the image via a camera in the housing, computing the digital image data and the orientation data to yield a status of the headlight via the processor, and displaying the status of the headlight on the controller.

The step of focusing the headlight beam received through the aperture via the lens to produce the image on the interior surface may also be provided. The image may have characteristics of a simulated distance between the headlight and the housing that is greater than an actual distance between the headlight and the housing. The centerline of the vehicle may be based on one of (i) a center crease in a hood of the vehicle, (ii) a side edge of the hood of the vehicle, and (iii) a first reference point on the vehicle aligned with a second reference point on the vehicle. The first reference point may be a hood ornament on the vehicle and the second reference point may be a rearview mirror in the vehicle. The steps of measuring a slope of a floor supporting the vehicle, inputting the slope into the controller, and computing the status of the headlight based on the slope may also be provided. The vehicle may have no passengers and a full tank of gasoline.

The foregoing and other objects are intended to be illustrative of the present general inventive concept and are not meant in a limiting sense. Many possible embodiments of the present general inventive concept may be made and will be readily evident upon a study of the following specification and accompanying drawings comprising a part thereof. Various features and subcombinations of present general inventive concept may be employed without reference to other features and subcombinations. Other objects and advantages of this present general inventive concept will become apparent from the following description taken in connection with the accompanying drawings, wherein is set forth by way of illustration and example, an embodiment of this present general inventive concept and various features thereof.

BRIEF DESCRIPTION OF THE DRAWINGS

A preferred embodiment of the invention, illustrative of the best mode in which the applicant has contemplated applying the principles, is set forth in the following description and is shown in the drawings.

Figure 1:
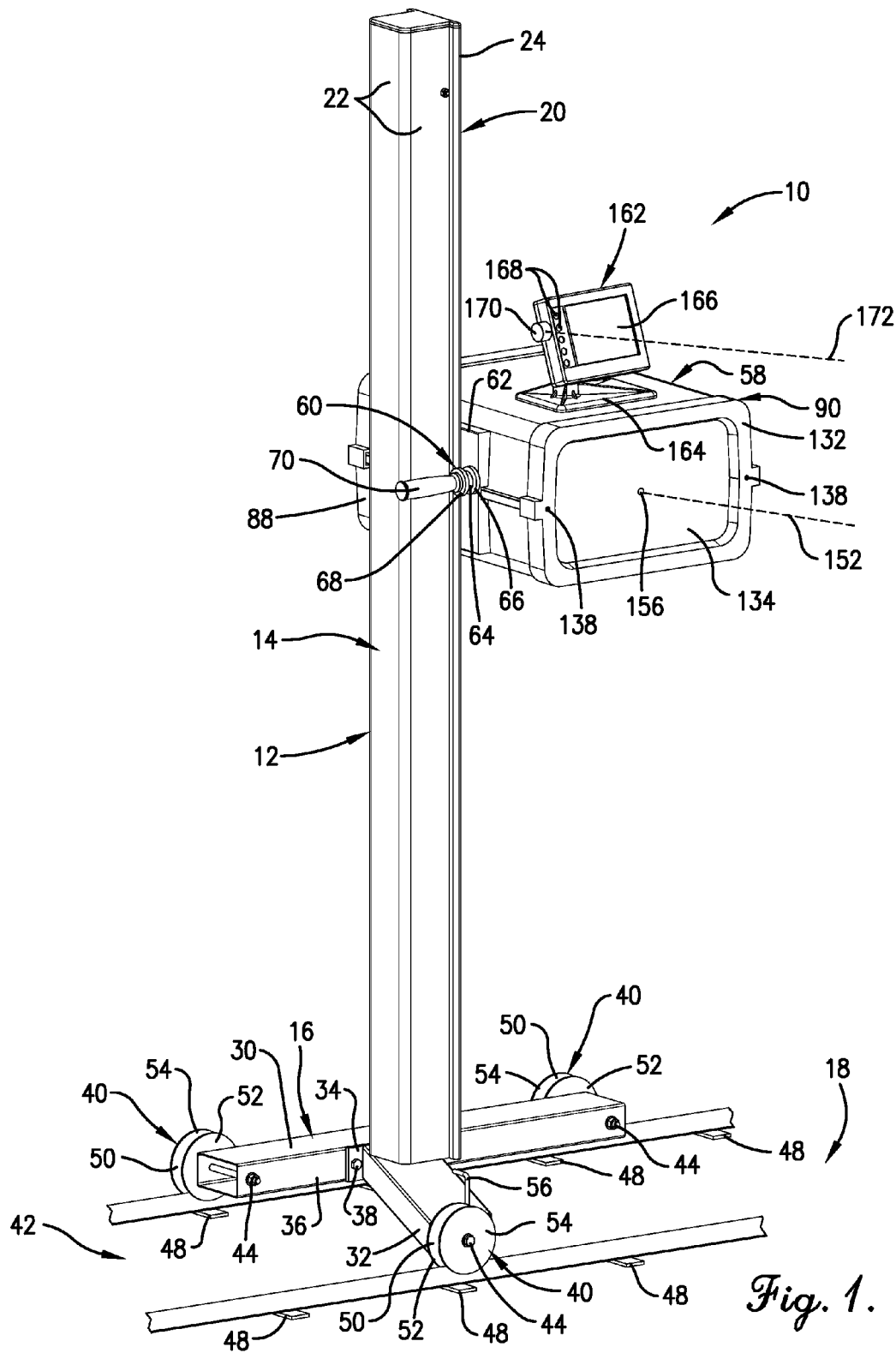
FIG. 1 is a front perspective view of the headlight aimer assembly illustrated in FIG. 1.

The drawing figures do not limit the present inventive concept to the specific embodiments disclosed and described herein. The drawings are not necessarily to scale, emphasis instead being placed upon clearly illustrating the principles of the illustrated embodiment.

DETAILED DESCRIPTION OF THE PREFERRED EMBODIMENTS

The present inventive concept is susceptible of embodiment in many forms. While the drawings illustrate, and the specification describes, certain embodiments of the invention, it is to be understood that such disclosure is by way of example only. The principles of the present inventive concept are not limited to the particular disclosed embodiments.

Figure 2:
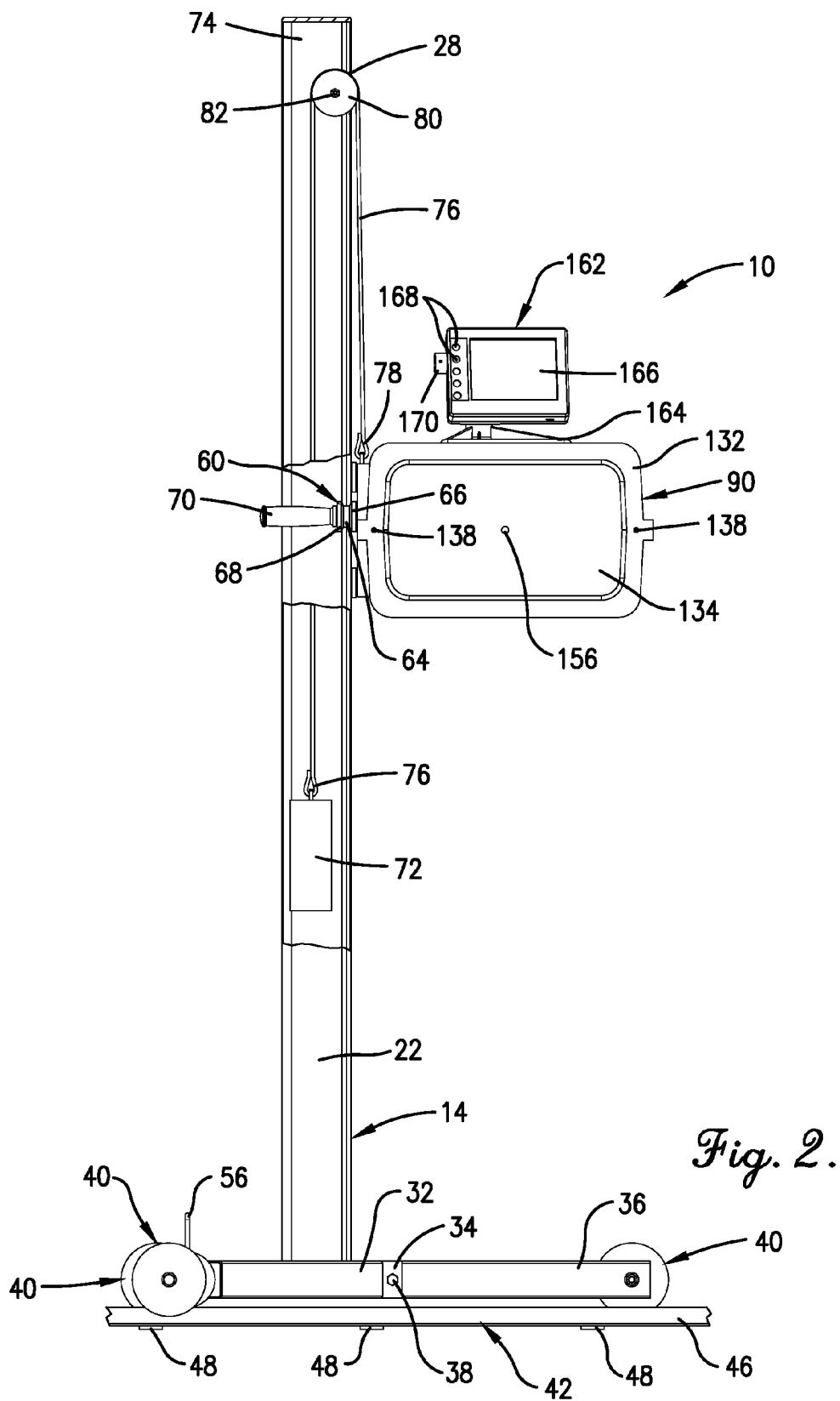
FIG. 2 is a top plan view of the headlight aimer assembly illustrated in FIG. 1 with a portion cut away to partially illustrate an interior of the headlight aimer assembly.
Figure 3:
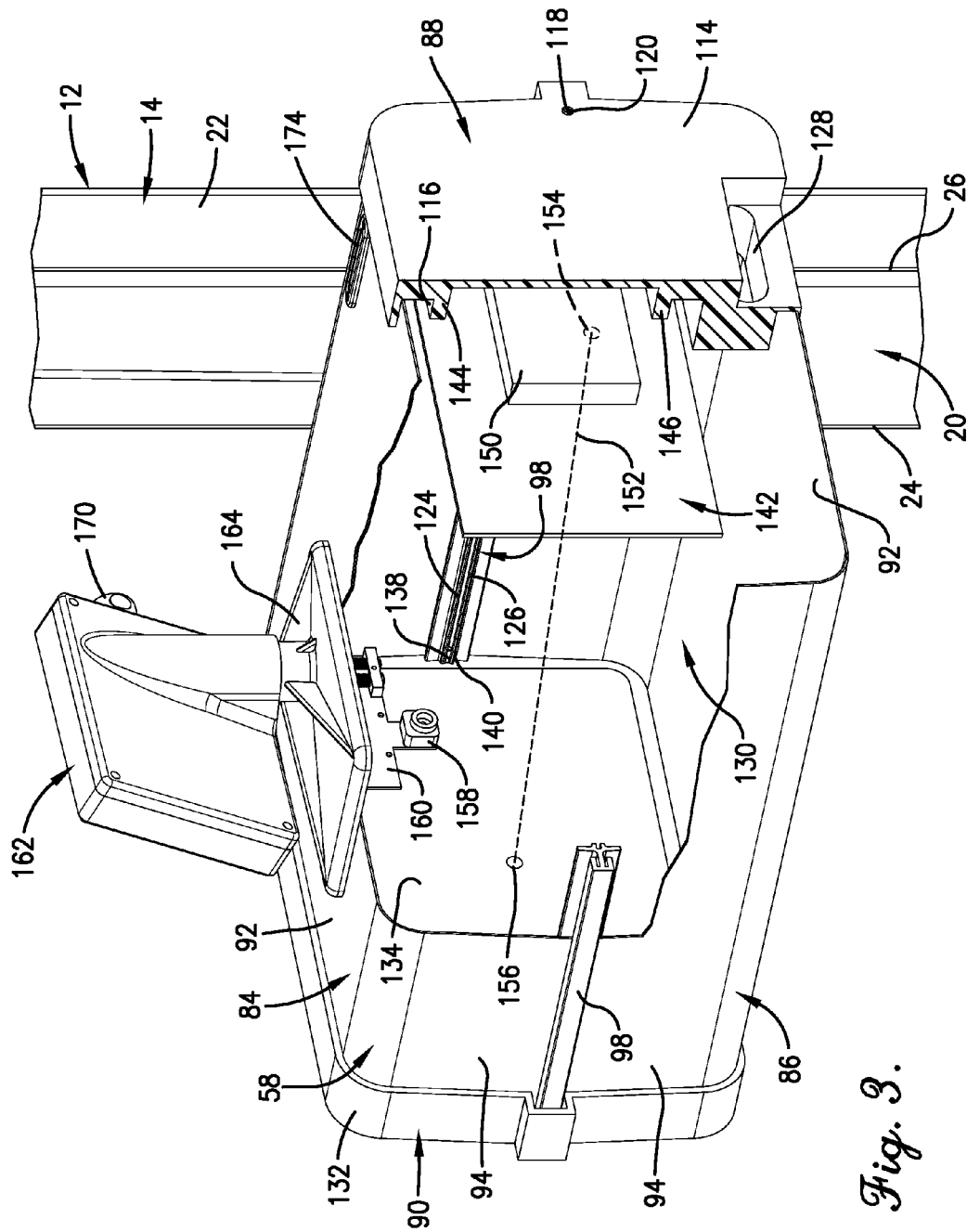
FIG. 3 is a front perspective view of the headlight aimer assembly illustrated in FIG. 1 with a portion cut away to partially illustrate an interior of the headlight aimer assembly.

With initial reference to FIGS. 1-3, a headlight aimer assembly 10 in accordance with the exemplary embodiment of the present inventive concept is illustrated. The headlight aimer assembly 10 includes a stand 12 with an upright portion 14 that is supported by a base 16 on a ground surface 18 (e.g., a cement garage floor in a bay of an auto mechanic shop). The upright portion 14 is an elongated generally rectangular post with planar track 20 on one side of the upright portion 14. The track 20 extends beyond sides 22 of the upright portion 14 to form ridges 24, 26 that extend vertically on one side of the upright portion 14. Near a top end of the upright portion 14 is an aperture 28 formed in the track 20.

The base 16 includes a parallel foot 30 and a non parallel foot 32 that are secured together in a non-perpendicular configuration so as to provide a higher degree of stability to the headlight aimer assembly 10. In the exemplary embodiment, a bracket 34 on an end of the non parallel foot 32 is fastened to a side surface 36 of the parallel foot 26 at an approximate center thereof and at an angle of approximately forty-five degrees via a bolt 38. It is foreseen, however, that the parallel foot 26 and a non parallel foot 28 may be secured together at different angles and by other attachment means without deviating from the scope of the present invention.

A plurality of wheels 40 are secured to the parallel foot 30 and the non parallel foot 32 to permit movement of the stand 12 and the base 16 preferably along a track 42 or alternatively along the supporting ground surface 18. In the exemplary embodiment, three wheels 30 are fastened to the base 16 via bolts 44 with two of the wheels 30 bolted to opposite ends of the parallel foot 26 and one of the wheels 30 bolted to one end of the non parallel foot 26. It is foreseen, however, that any number of wheels 30 may be fastened to the base 16 in various configurations and using various attachment means without deviating from the scope of the present invention.

The track 42 extends horizontally across the ground surface 18 and may include two rails 46 that may be, for example, approximately five feet long. Each of the rails 46 are supported by a plurality of lateral support slats 48 that are attached perpendicularly thereto and space the two rails 46 from the ground surface 18. Each of the two rails 36 is partially received into a groove 50 in each wheel 40. The groove 50 is defined by inner and outer circumferential discs 52, 54 on each wheel 40. A brake 56 is provided on one of the wheels 40 to selectively lock and unlock the stand 12 and the base 16 in a fixed configuration relative to and anywhere along the track 42. In the exemplary embodiment, the brake 56 is located at a front of the headlight aimer assembly 10 between the wheel 40 of the non parallel foot 32 and the non parallel foot 32 to enable easy access to the user. It is foreseen, however, that the brake 56 may be located on any one or more of the wheels 40 without deviating from the scope of the present invention.

Secured to the vertical track 20 of the upright portion 14 is an elevated housing assembly 58. The housing assembly 58 is connected to and operable to travel along the vertical track 20 of the upright portion 14 via a plurality of wheels 60 that are fastened to a mount 62 on the housing assembly 58, which enables a height of the housing assembly 58 to be selectively adjusted from between approximately fourteen and sixty inches from the ground surface 18. Each of the wheels 60 are secured to one of the ridges 24, 26 on either side of the vertical track 20 of the upright portion 14 so that that the vertical track 20 is pinned therebetween. The ridges 24, 26 are partially received into a groove 64 in each wheel 60. The groove 64 is defined by inner and outer discs 66, 68 on each wheel 60. In the exemplary embodiment, one wheel 60 is located on a front side of the headlight aimer assembly 10, and two wheels 60 are located on a rear side of the headlight aimer assembly 10. It is foreseen, however, that any number of wheels 60 in any configuration may be used without deviating from the scope of the present invention. It is foreseen, however, that any number of wheels 60 in any configuration may be used to fasten the housing assembly 58 to the upright portion 14 without deviating from the scope of the present invention.

The wheel 60 on the front side of the primary housing 58 is equipped with a brake 70 that is operable to selectively permit or prevent movement of the housing assembly 58 relative to the upright portion 14 so that the primary housing 58 may be selectively maintained in a fixed configuration relative to and anywhere along the upright portion 14. In the exemplary embodiment, the brake 70 is located on the wheel 60 at the front of the headlight aimer assembly 10 to enable easy access to the user. It is foreseen, however, that the brake 70 may be located on any one or more of the wheels 30 without deviating from the scope of the present invention.

A counter-balance 72 is housed on an interior 74 of the upright portion 14 and is connected to the mount 62 via a cable 76. The cable 76 is secured at one end to the counter-balance via a hook 76 on the counter-balance 72, extends through the aperture 24 in the upright portion, and is secured at another end to the mount 62 via a hook 78 on the mount 62. The cable 76 is wrapped around a pulley 80 that is mounted near the top of the upright portion 14 via a bolt 82. The pulley 80 is substantially housed within the upright portion 14 and extends partially through the aperture 24 in the upright portion 14. The counter-balance 72 is operable to displace weight of the housing assembly 58 as the housing assembly 58 travels along the vertical track 20 so that the headlight aimer assembly 10 is maintained in a desired upright configuration.

The housing assembly 58 includes upper, lower, and rear panels 84, 86, 88, and a front panel assembly 90. The upper and lower panels 84, 86 each have a horizontal surface 92 and vertical side surfaces 94, and each of the vertical side surfaces 94 have outwardly-extending lips 96 at ends thereof that project substantially parallel to the horizontal surface 92. In the exemplary embodiment, the upper and lower panels 84, 86 are made of a single piece of sheet metal. It is foreseen, however, that the upper and lower panels 84, 86 could be made of any like material (e.g., plastic) without deviating from the scope of the present invention.

Figure 3B:
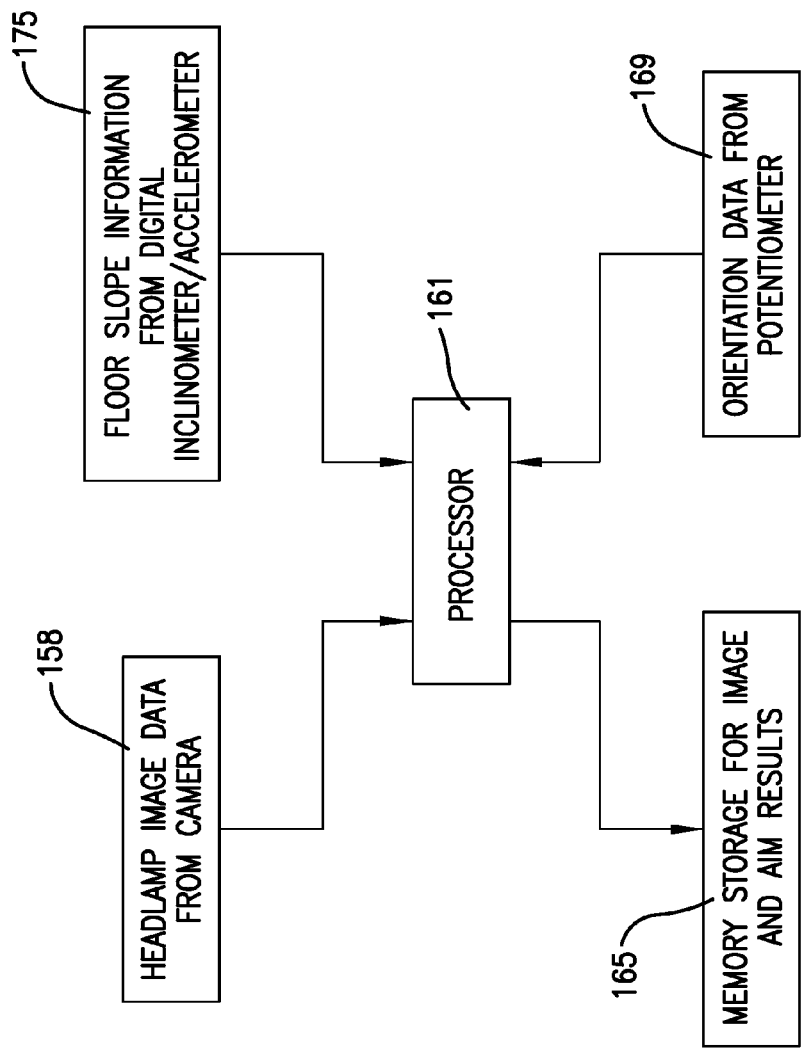
FIG. 3*b* is a diagram of a process of the headlight aimer assembly illustrated in FIG. 1.
Figure 3A:
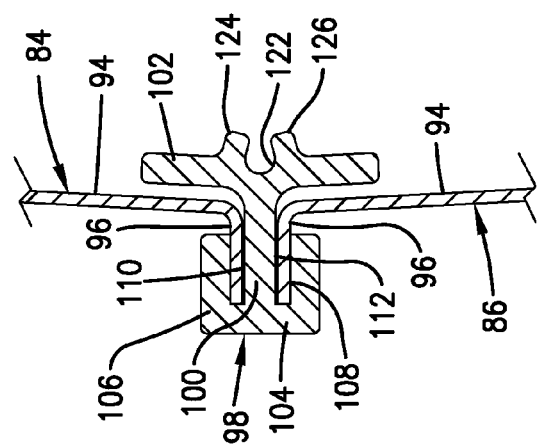
FIG. 3*a* is a magnified fragmentary cross-sectional view of a portion of the headlight aimer assembly illustrated in FIG. 1.
Figure 4:
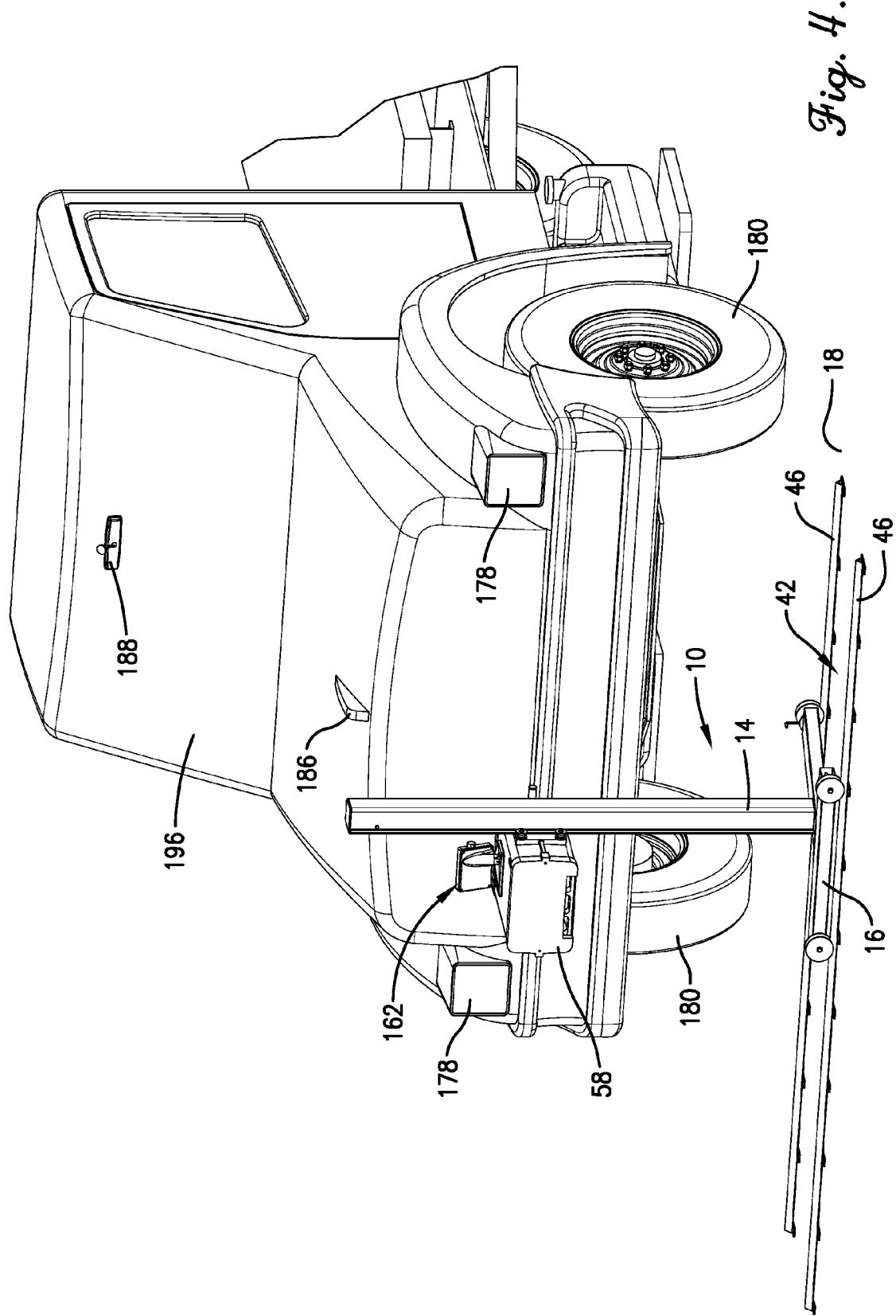
FIG. 4 is a rear left side perspective view of the headlight aimer assembly illustrated in FIG. 1, illustrating the headlight aimer assembly in use with a vehicle in a first configuration.
Figure 5:
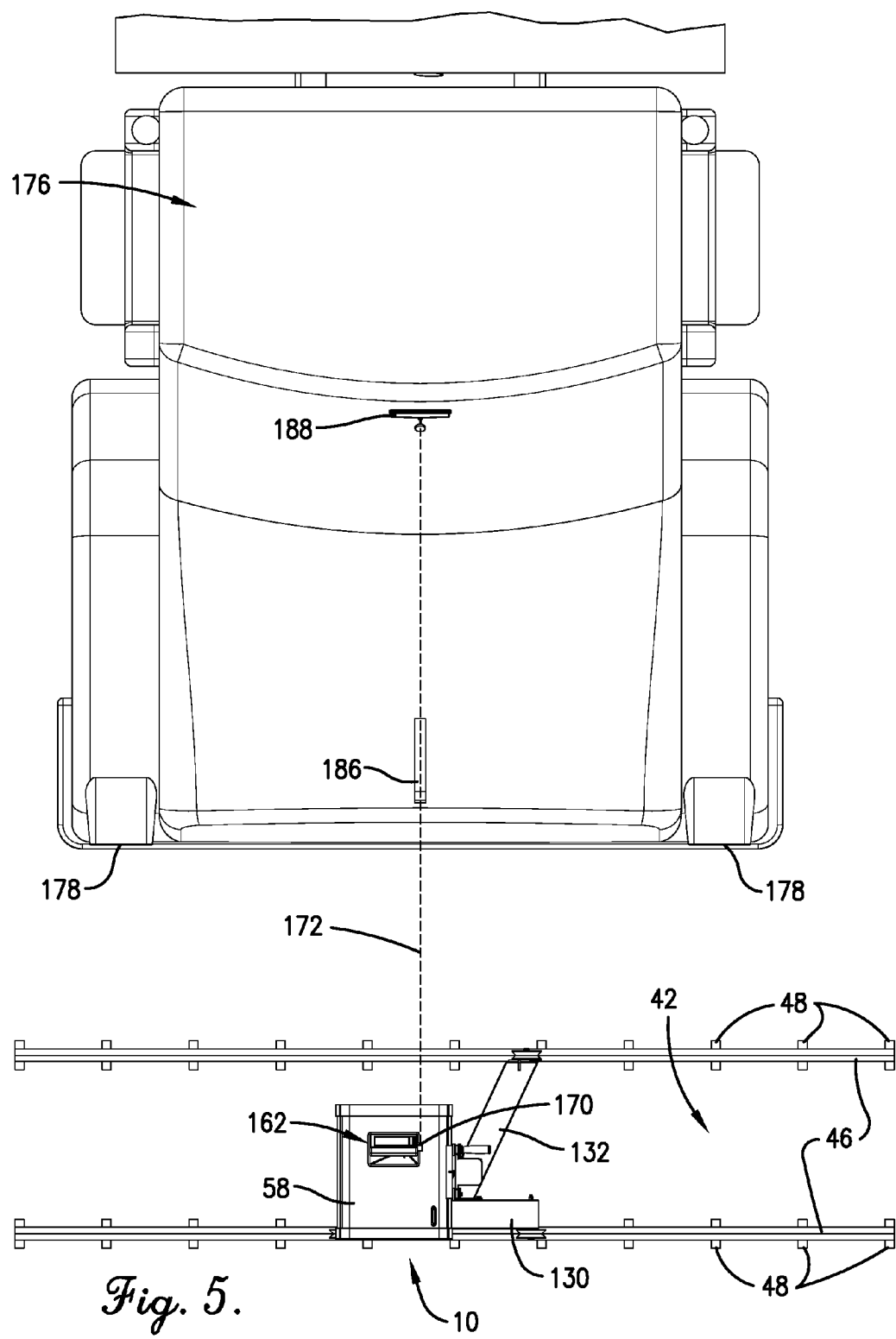
FIG. 5 is a top plan view of the headlight aimer assembly illustrated in FIG. 4, illustrating the headlight aimer assembly in use with the vehicle in the first configuration.

The lips 96 are sized and shaped to be independently received by an elongated engagement strip 98 situated on either side of the housing assembly 58. Each of the elongated engagement strips 98 has a horizontal abutment surface 100 that spaces a backstop 102 and a frontstop 104, as illustrated in FIG. 3a. The frontstop 104 has upper and lower walls 106, 108 that project from either end of the frontstop 104 in a direction parallel to the horizontal abutment surface 100. The upper and lower walls 106, 108 define upper and lower voids 110, 112 between the horizontal abutment surface 100 and the upper and lower walls 106, 108, respectively. The upper and lower voids 110, 112 are sized and shaped to respectively receive the lips 96 of the upper and lower panels 84, 86 therein. Each of the lips 96 abut and extend along the horizontal abutment surface 100. Ends of each of the lips 96 abut the frontstop 104 and each of the vertical side surfaces 94 abuts the backstop 102. In this manner, the upper and lower panels 84, 86 are secured together via the engagement strips 98.

The rear panel 88 includes a vertical surface 114 with groove 116 about a perimeter thereof that is sized and shaped to partially receive the upper and lower panels 84, 86 and the engagement strip 98 therein. The rear panel 88 also includes apertures on either side of the vertical surface 114 that are each sized and shaped to receive a screw 120 therein that is then anchored to the engagement strip 98 via a receiver 122 at each end of each of the engagement strips 98 on the rear panel 88 end. In this manner, the rear panel 88 is secured to the engagement strip 98 and ultimately to the upper and lower panels 84, 86. In the exemplary embodiment, the receiver 122 is a partial ring formed between two ribs 124, 126 that extend down an entire length of each of the engagement strips 98. It is foreseen, however, that the rear panel 88 may be secured to the upper and lower panels 84, 86 via any like attachment means.

An exhaust vent 128 is included in the vertical surface 114 and is operable to permit circulation of air from and/or to an interior 130 of the housing assembly 58. In the exemplary embodiment, the rear panel 88 is a single piece of synthetic resin. It is foreseen, however, that any like material may be used without deviating from the scope of the present invention.

The front panel assembly 90 includes a frame 132 that extends about a perimeter of a lens 134 that is secured therein. Similar to the rear panel 88, the frame portion 132 includes a groove (not illustrated) about a perimeter thereof that is sized and shaped to partially receive the upper and lower panels 84, 86 and the engagement strip 98 therein. Additionally, the frame 132 has apertures (not illustrated) on either side thereof that are each sized and shaped to receive a screw 138 therein. Similar to the rear panel 88, each screw 138 of the frame 132 is anchored to the engagement strip 98 via a receiver 140 at each end of each of the engagement strips 98 on the front panel assembly 90 end. In this manner, the front panel assembly 90 is secured to the engagement strip 98 and ultimately to the upper and lower panels 84, 86.

The lens 134 is a Fresnel lens that is operable to focus light incident thereon and transmit such to a screen 142 located on the interior 130 of the housing assembly 58. The screen 142 is secured to upper and lower supports 144, 146 that extend from the rear panel 88 via screws (not illustrated) or the like. In the exemplary embodiment, the screen 142 is of a planar white vinyl material having a degree of reflectivity. It is foreseen, however, that any like material may be used without deviating from the scope of the present invention.

On a rear side 148 of the screen 142 and between the screen 142 and the rear panel 88 is a headlight alignment laser 150 that is operable to project a laser beam 152 to an outside of the primary box by projecting the laser through an aperture 154 in the screen 142 and through an aperture 156 in the lens 134. A camera 158 (e.g., a complementary metal oxide semiconductor (CMOS) camera with a pin-hole lens or the like) is secured to and powered by a circuit board 160 that depends from the upper panel 84 on the interior of the housing assembly 58. The camera 158 is oriented to face the screen 142 and is operable to convert light patterns displayed on the screen 142 to a digital image thereof.

The circuit board 160 electrically connects the camera 158 to a processor 161 housed in a control unit 162 that is mounted on top of the upper panel 84 on an exterior side thereof via a base 164. The processor 161 processes image data received from the camera 158 via the circuit board 160 and stores the image data via a memory 165 in the control unit 162, as illustrated in FIG. 3b.

The control unit 162 includes a display screen 166 that is operable to display processed data from the processor 161. Also included on the control unit 162 are a plurality of control buttons 168 that are operable to control the headlight aimer assembly 10. The control unit 162 is operable to pivot horizontally with respect to the base 164 and the housing assembly 58 and obtain orientation data of the control unit 162 relative to the housing assembly 58 via a potentiometer 169 and transmit the orientation data to the processor 161.

A reference point alignment laser 170 is housed on a side of the control unit 162 and is operable to project a laser beam 172 therefrom. The laser beam 172 may be aimed by pivoting the reference point alignment laser 170 vertically and/or pivoting the control unit 162 horizontally.

In use, the headlight aimer assembly 10 is assembled by a user on the ground surface 18, and preferably on a surface that is free from obstacles (e.g., debris on and cracks in the ground surface 18). Additionally, the ground surface 18 should be reasonably horizontally level with any slopes avoided, (e.g., a slope caused by a drain in the ground surface 18). To ensure the headlight aimer assembly 10 is level, a level 174 may be affixed to the headlight aimer assembly 10 so that the user may manually adjust a position of the headlight aimer assembly 10 until it is reasonably level. In the exemplary embodiment, the level 174 is affixed to the upper panel 84 of the housing assembly 58, as illustrated in FIG. 3. It is foreseen, however, that one or more levels 174 may affixed to the headlight aimer assembly 10 without deviating from the scope of the present invention. Alternatively or in addition to the level 174, an inclinometer and/or an accelerometer 175 may be mounted to the headlight aimer assembly 10 (e.g., on a forty-five degree slope to perfect level) to calculate the slope of the ground surface 18 under the headlight aimer assembly 10 and transmit such to the processor 161. The processor 161 factors in the calculated slope of the ground surface 18 under the headlight aimer assembly 10, and provides a result with increased accuracy as further discussed hereafter. In this manner, the stand 12 of the headlight aimer assembly 10 is operable to traverse back and forth along the horizontal track 42 in a defined straight path with accuracy and repeatability.

Turning to FIGS. 4-9, a vehicle 176 is positioned in front of and facing the headlight aimer assembly 10 on the ground surface 18 at approximately three feet from the horizontal track 42 with headlights 178 to be aimed activated. If the slope of the ground surface 18 under the vehicle 176 is unknown (e.g., during initial setup of the headlight aimer assembly 10), the user may measure the slope of the ground surface 18 under the vehicle 176. In the exemplary embodiment, the user may measure the slope of the ground surface 18 between tires 180 using a level 182 with a target 184, such as the level measuring system sold under the trademark Hoppy (e.g., the Model G2 spit image transit system). The level 182 and target 184 may be respectively positioned at the front and rear tires 180 to determine the slope of the ground surface 18 under the vehicle 176.

The control unit 162 of the headlight aimer assembly 10 is activated by pressing one of the control buttons 168. Upon activation, the display screen 166 provides a number of options to permit calibration of the headlight aimer assembly 10 via the control buttons 168 based on its intended use. For example, a unit of measurement may be selected from inches or centimeters, the desired aiming standard may be selected based on country of use, the type of headlight 178 to be aimed may be entered (e.g., low, high, vol, vor, fog), and the slope of the ground surface 18 under the vehicle 176 may be entered. Additionally, the headlight aimer assembly 10 may self-calibrate via the inclinometer and/or accelerometer 175 as previously discussed.

If the headlight aimer assembly 10 is to be used in different bays of an auto mechanic shop, the slope of the ground surface 18 for each of the different bays may be determined upon initial setup, entered into the control unit 162, and assigned bay numbers for future selection. Thereafter, the user may select the appropriate bay as displayed on the display screen 166 without re-measuring the slope of the plurality of different bays. In this manner, the headlight aimer assembly 10 may be used in a plurality of different locations more efficiently.

To determine a degree of alignment between the headlight aimer assembly 10 and the vehicle 176, the user presses one of the control buttons 168 to activate the reference point alignment laser 170 so that the laser beam 172 is projected therefrom. While the reference point alignment laser 170 is activated, the control unit 162 emits an audible beeping noise from a speaker (not illustrated) on the control unit 162 and displays the message "CAUTION LASER ACTIVE" at the bottom of the display screen 166. The housing assembly 58 of the headlight aimer assembly 10 is then moved to an approximate horizontal centerline of the vehicle 176 by pushing the stand 12 along the horizontal track 42. To permit movement of the housing assembly 58 relative to the horizontal track 42, the brake 56 is unlocked. When the housing assembly 58 is aligned with the approximate horizontal centerline of the vehicle 176, the brake 56 is locked.

The user ensures horizontal alignment of the headlight aimer assembly 10 and the vehicle 176 by selecting one or more reference points on the vehicle 176 that are commonly known to be representative of the vertical centerline of the vehicle 176, such as a hood ornament 186 and a mirror 188 of the vehicle 176. With the reference points in view, the user rotates the reference point alignment laser 170 up and/or down until the laser beam 172 is able to strike both of the reference points. To facilitate such, the user may affix a laser-dot target (not illustrated) (e.g., an adhesive and/or mirror hanging target) to the one or both of the reference points to provide a more precise target and increase accuracy.

Figure 6:
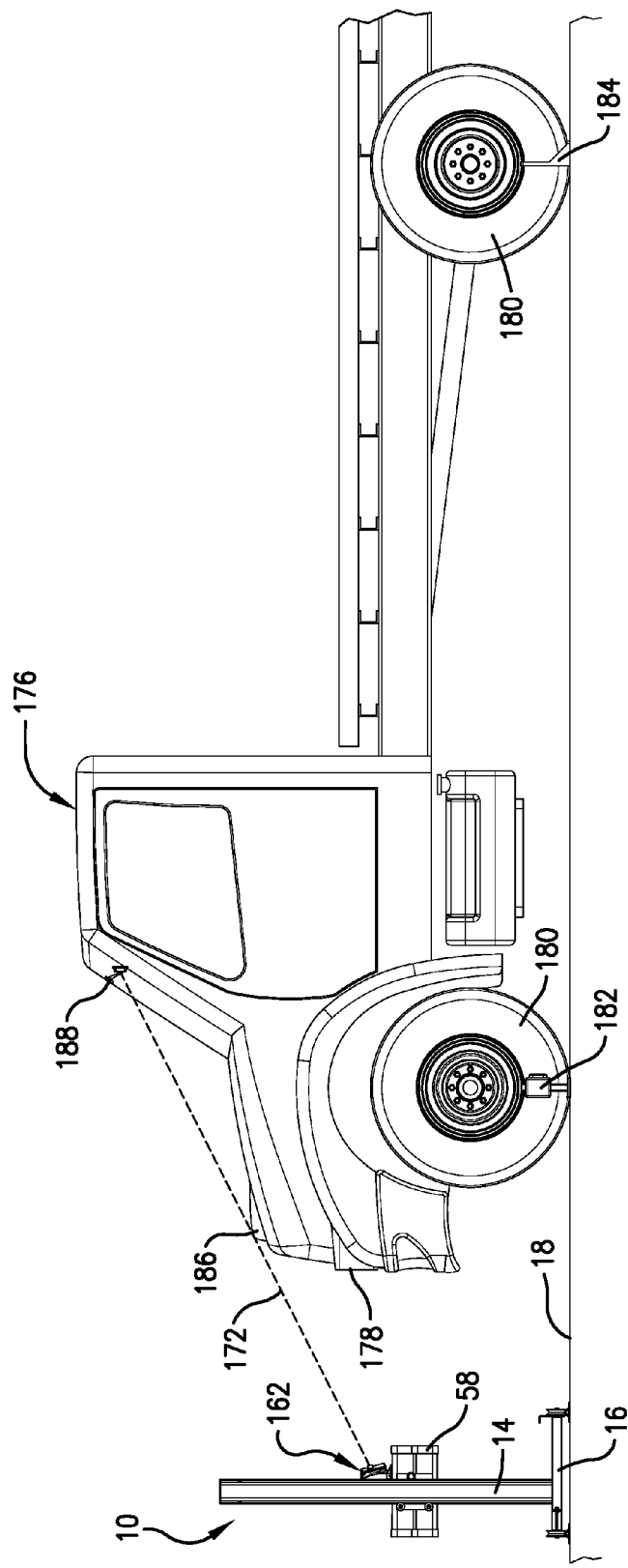
FIG. 6 is an elevated left side view of the headlight aimer assembly illustrated in FIG. 4, illustrating the headlight aimer assembly in use with the vehicle in the first configuration.
Figure 7:
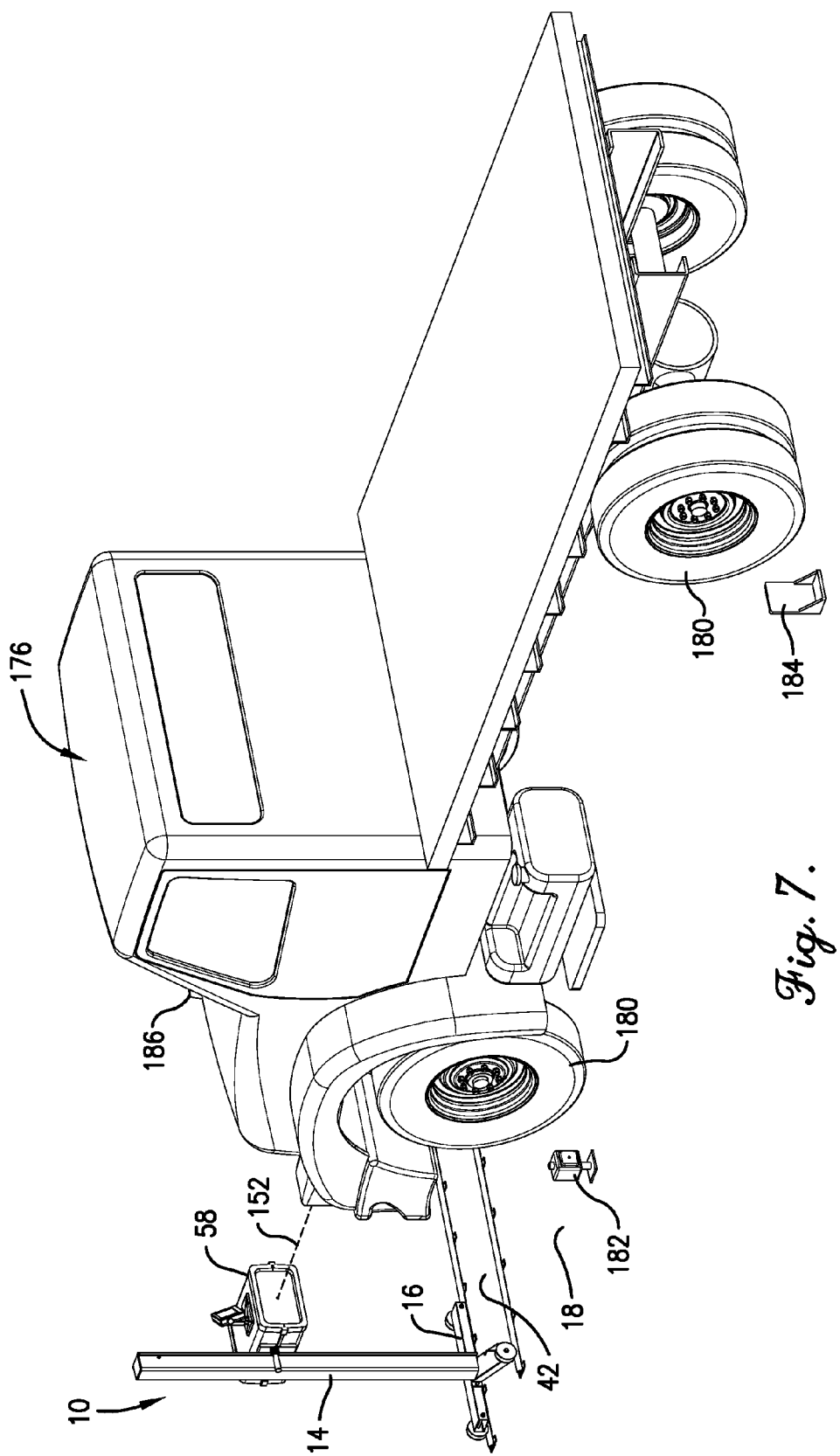
FIG. 7 is a front left side perspective view of the headlight aimer assembly illustrated in FIG. 1, illustrating the headlight aimer assembly in use with a vehicle in a second configuration.
Figure 8:
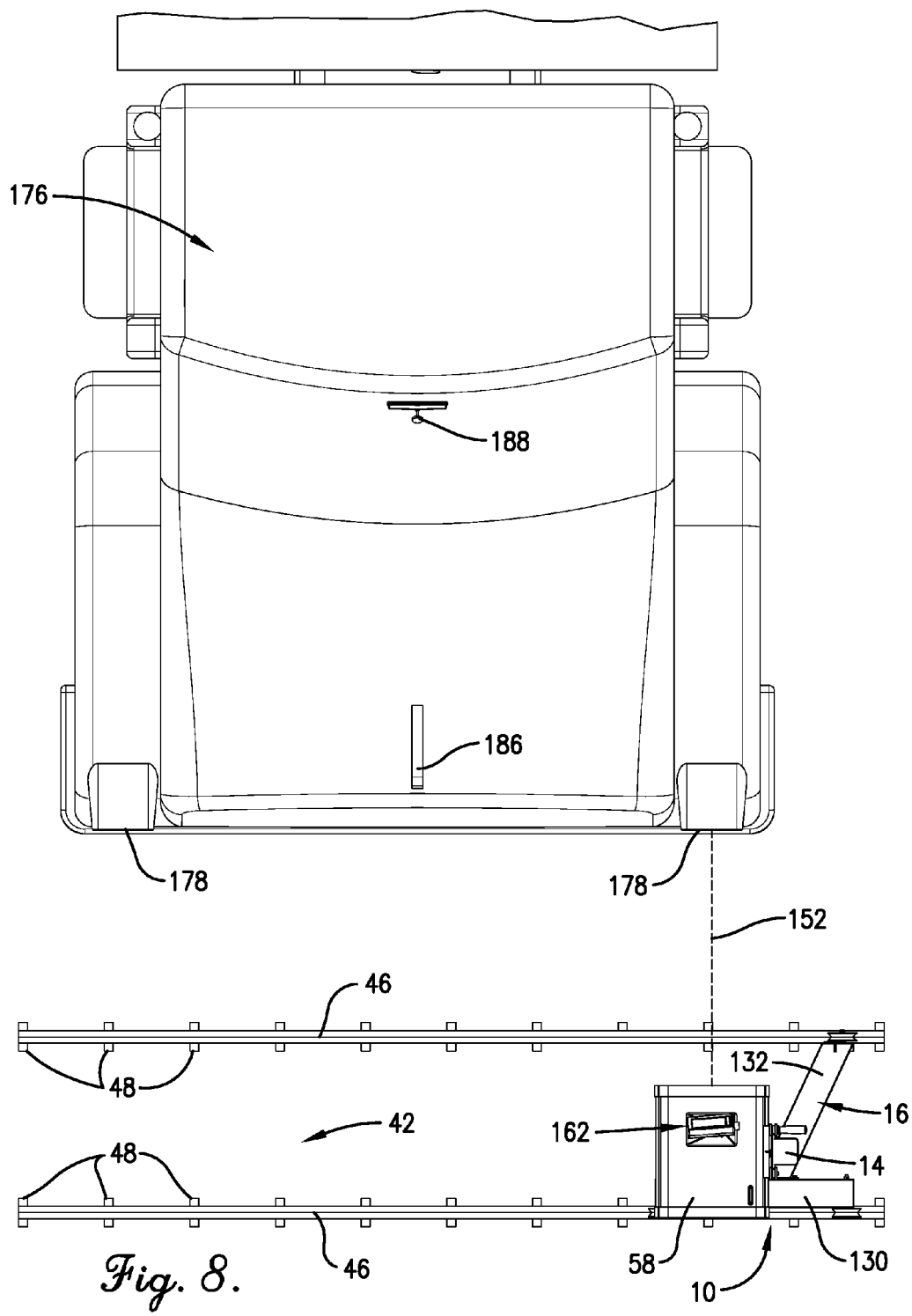
FIG. 8 is a top plan view of the headlight aimer assembly illustrated in FIG. 7, illustrating the headlight aimer assembly in use with the vehicle in the second configuration.
Figure 9:
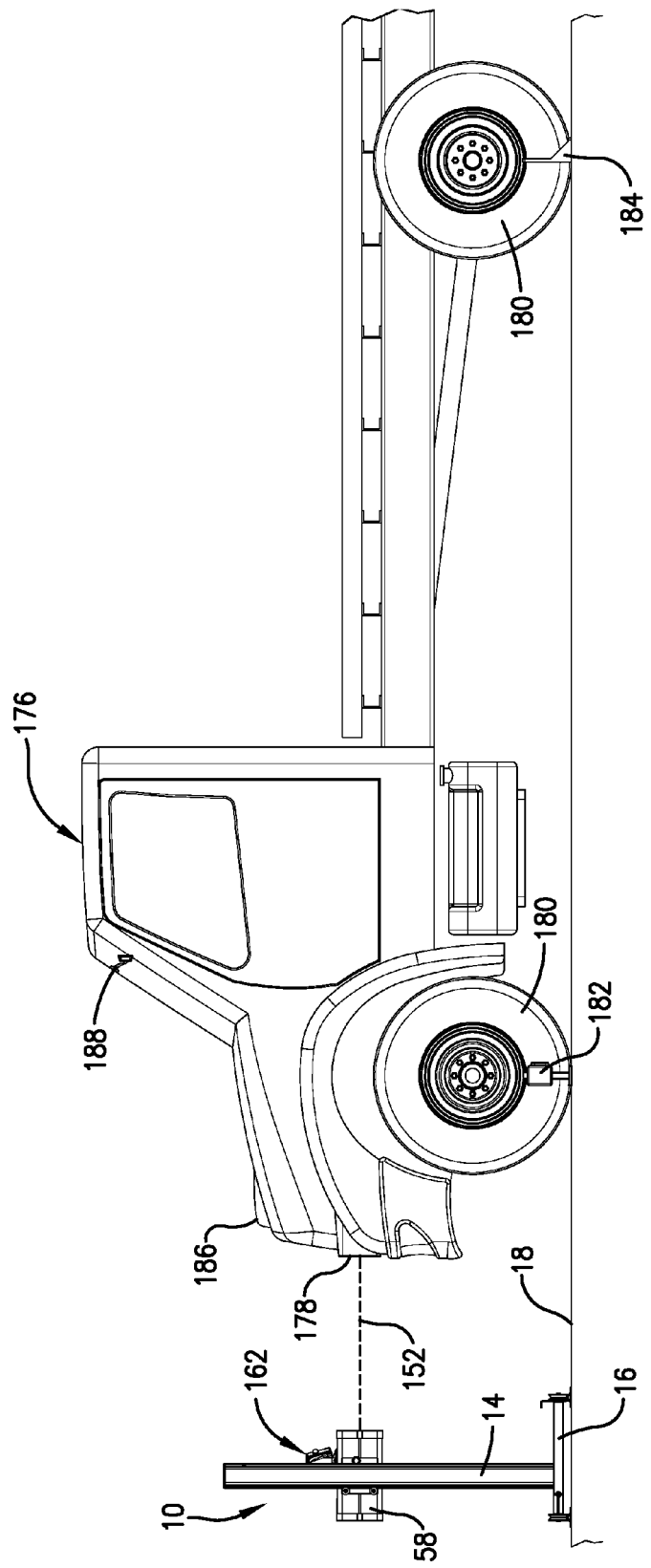
FIG. 9 is an elevated left side view of the headlight aimer assembly illustrated in FIG. 7, illustrating the headlight aimer assembly in use with the vehicle in the second configuration.

As illustrated in FIG. 6, the laser beam 152 simultaneously strikes both the hood ornament 186 and the mirror 188 of the vehicle 176. In use with other vehicles, however, the laser beam 152 may not simultaneously strike both the hood ornament 186 and the mirror 188 of the vehicle 176. To ensure proper alignment of the headlight aimer assembly 10 and the vehicle 176 in such instances, the user vertically rotates the reference point alignment laser 170 back and forth along a reference point and/or between two reference points (e.g., the hood ornament 186 and the mirror 188) to form an imaginary vertical plane therebetween. It is foreseen that the user may select other reference points such as, but not limited to a bumper, center of grill or like point on facial without deviating from the scope of the present invention. If the plane defined by the laser beam 172 is not parallel to the centerline of the vehicle 176, the user may horizontally rotate the control unit 162 with respect to the housing assembly 58 until the plane defined by the laser beam 172 is parallel to the centerline of the vehicle 176.

Once the reference point alignment laser 170 is horizontally aligned with the centerline of the vehicle 176, one of the control buttons 168 is pressed to simultaneously record orientation data (e.g., the rotational position) of the control unit 162 relative to the housing assembly 58 and deactivate the reference point alignment laser 170. The orientation data, which includes any offset therebetween, is measured by the control unit 162 (e.g., via the potentiometer 169) and communicated to the processor 161, which calculates and stores a difference in degrees of rotation to linear inches at twenty-five feet.

To align the housing assembly 58 of the headlight aimer assembly 10 with one of the headlights 178 to be aimed of the vehicle 176, the headlight alignment laser 150 is activated so that the laser beam 152 is projected therefrom by pressing one of the control buttons 168. Similar to the reference point alignment laser 170, while the headlight alignment laser 150 is activated, the control unit 162 emits an audible beeping noise from the speaker and displays the message "CAUTION LASER ACTIVE" at the bottom of the display screen 166.

The stand 12 is pushed along the horizontal track 42, after unlocking the brake 56, until the laser beam 152 strikes the center of the headlight 178 to be aimed, at which point the brake 56 is locked. If the housing assembly 58 is not vertically aligned with the center of the headlight 178 to be aimed, the housing assembly 58 may be raised or lowered with respect to the vertical track 20 of the upright portion 14 until the laser beam 152 strikes the center of the headlight 178 to be aimed. To facilitate such, the user may affix a laser-dot target (not illustrated) (e.g., an adhesive and/or mirror hanging target) to the center of the headlight 178 to be aimed to provide a more precise target and increase accuracy. To permit movement of the housing assembly 58 relative to the vertical track 20, the brake 70 is unlocked. When the housing assembly 58 is aligned with the headlight 178 to be aimed, the brake 70 is locked.

Once the headlight alignment laser 150 is aligned with the center of the headlight 178 to be aimed, one of the control buttons 168 is pressed to simultaneously activate the camera 158 and deactivate the headlight alignment laser 150. With the headlight 178 to be aimed activated, light emitted therefrom passes through the Fresnel lens 134, which focuses and transmits the light to form an image on the screen 142. The Fresnel lens 134 converts the light so that the image on the screen 142 has characteristics that are simulated and equivalent to characteristics of light projected from a distance that is greater than the actual distance between the housing assembly 58 and the headlight 178 to be aimed. In the present embodiment, the Fresnel lens 134 forms an image on the screen 142 with simulated characteristics that are equivalent to characteristics of light transmitted from twenty-five feet. It is foreseen, however, that the Fresnel lens 134 may be designed to simulate characteristics that are equivalent to characteristics of light projected from any distance without deviating from the scope of the present invention.

The camera 158 records a digital image based on the image on the screen 142 and transmits image data to the processor 161 in the control unit 162 via the circuit board 160. The processor 161 identifies a hot spot or focal point of the image and then displays a processed image on the display screen 166 based on the image data from the camera 158, the orientation data of the control unit 162 relative to the housing assembly 58 from the potentiometer 169, the headlight type data selected by the user, the aiming standard data selected by the user, and any additional data (e.g., slope data of the vehicle 176 from the level and target 182, 184 and slope data of the headlight aimer assembly 10 from the inclinometer and/or accelerometer 175). The processed image is displayed on the display screen 166 with respect to a grid having an X axis and a Y axis. Also displayed on the display screen 166 is a degree of offset, if any, of the focal point of the processed image from a center of the X axis and Y axis on the grid. For instance, if the focal point is determined by the processor 161 to be in a lower right quadrant of the grid, the display screen will indicate the offset (e.g., LOW 7.3, RIGHT 2.7).

If there is an offset, the user aims the headlight 178 by adjusting headlight aiming screws (not illustrated) via tools (e.g., a screwdriver, wrench, or special tool) as needed until there is no offset of the processed image from the center of the X and Y axes, as indicated by the display screen 166. When the headlight 178 is properly aimed according to the selected aiming standard (e.g., within a predefined tolerance from a perfect aim), the control unit 162 will display the message "AIM OK" at the bottom of the display screen 166 and emit one or more audible beep (e.g., three audible beeps) via the speaker. The aim results may be stored in the memory 165.

The processor 161 may be programmed to process the aforementioned data using a variety of formulas to yield the processed image via any formula. In the exemplary embodiment, the processor 161 calculates an offset between actual or present aim of the headlight 178 and perfect aim, which is then displayed on the display screen 134 with respect to X and Y axes. As previously discussed, the digital image from the camera 158 is displayed on the screen 142 with characteristics simulated by the lens 143 indicating that the displayed image originated from a distance of twenty-five feet, which is factored to find X and Y values.

To determine Y value, the processor 161 obtains the slope data of the vehicle 176 from the level and target 182, 184 and the slope data of the headlight aimer assembly 10 from the inclinometer and/or accelerometer 175, and uses an angle of compensation formula that is expressed as $Y=\sin(a)*d$, where "d" is 300 in. or 25 ft., "a" is relative floor slope angle, and "Y" is equal to amount of offset the processor 161 applies to vertical aim. For example, if the headlight 178 has a slope of zero degrees and the headlight aimer assembly 10 has a slope of one degree, then the relative angle or "d" is one degree. As applied to the formula $Y=\sin(1)*300$, $Y=5.24$, or $5.24=0.01745*300$. In this manner, the processor 161 processes the digital image from the camera 158, calculates vertical aim position, and adds the floor slope offset to yield a corrected aim position on the Y axis (i.e., the Y value).

To determine X value, the processor 161 calculates misalignment of the headlight aimer assembly 10 and the centerline of the vehicle 176 via a misalignment compensation formula that is expressed as X=sin(a)*d, where "d" is 300 in. or 25 ft., "a" is horizontal misalignment angle, and "X" is equal to the amount of offset the processor 161 applies to vertical aim. For example, if the vehicle 176 is horizontally misaligned with the headlight aimer assembly 10 at 1.5 degrees, (i.e. a=1.5 degrees), then the formula solves for X as follows: X=sin(1.5)*300, X=7.85 or 7.85=0.02616*300. In this manner, the processor 161 processes the digital image from the camera 158 and adds the horizontal misalignment offset to yield a corrected aim position on the X axis (i.e., the X value).

When the user is satisfied with the aim of the headlight 178 of the vehicle 176, the process is complete and the control unit 162 of the headlight aimer assembly 10 may be deactivated by pressing one of the control buttons 168. Alternatively, another headlight 178 may be aimed by pressing one of the control buttons 168 to activate the headlight alignment laser 150, as disclosed above, and then repeating the steps disclosed thereafter.

Accordingly, the headlight aimer assembly 10 is adaptable to various headlight standards, adaptable to various headlight types, and produces test results with increased accuracy and ease of reproduction relative to conventional aiming devices.

Having now described the features, discoveries and principles of the general inventive concept, the manner in which the general inventive concept is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the general inventive concept herein described, and all statements of the scope of the general inventive concept which, as a matter of language, might be said to fall therebetween.

What is claimed is:

1. A headlight aiming assembly comprising:
   a horizontally extending track;
   a stand mounted on the horizontal track for travel therealong, the stand having a vertical track;
   a guide bracket mounted on the vertical track of the stand for travel therealong;
   a housing secured to the guide bracket;
   a control unit with a base secured to the housing, the control unit having an orientation about a vertical axis that is adjustable relative to the housing;
   a camera in the housing operable to capture image data based on an image of light from a headlight and to transmit the image data;
   a first measuring device operable to measure a first angle of the orientation of the control unit about the vertical axis and to transmit the first angle to the control unit;
   a second measuring device operable to measure a second angle of an orientation of the housing about a horizontal axis and to transmit the second angle to the control unit; and
   a processor operable to receive the first angle, the second angle, and the image data and determine an aim of the headlight as an offset from a standard position.

2. The headlight aiming assembly of claim 1, wherein the processor is further operable to compute:
   an X-offset of the aim of the headlight based on the image data and
   a corrected X-offset as a sum of the X-offset and a correction factor corresponding to the first angle.

3. The headlight aiming assembly of claim 1, wherein the processor is further operable to:
   receive a third angle corresponding to a pitch angle about a horizontal axis for a vehicle housing the headlight,
   compute a Y-offset of the headlight based on the image data, and
   compute a corrected Y-offset as a sum of the Y-offset and a correction factor corresponding to the second angle and the third angle.

* * * * *